Patented June 8, 1943

2,321,309

UNITED STATES PATENT OFFICE 2,321,309

WELDING FLUX

Mike A. Miller, New Kensington, Pa., assignor to Aluminum Company of America, Pittsburgh, Pa., a corporation of Pennsylvania No Drawing. Application December 31, 1941, Serial No. 425,117

6 Claims. (Cl. 148—26)

This invention relates to the welding of aluminum, and it is particularly concerned with the provision of a superior flux for use in this operation. By the term "aluminum," I mean to include both commercially pure aluminum as well as the alloys wherein this metal constitutes at least 50 per cent by weight of the entire composition.

In order to satisfactorily join aluminum members by the fusion of metal therebetween, it has been found necessary to first remove the adherent oxide film which naturally forms on the surfaces of such members when they are exposed to the atmosphere. A flux containing alkali halides, especially one or more fluorides, is usually employed to accomplish this purpose. Moreover, the flux, after removing the oxide film, will adhere to the cleansed surface and so protect it against oxidation during the remainder of the joining operation.

A type of flux which has found extensive application in the welding of aluminum is one at least 50 per cent of which consists of the chlorides of the alkali metals, particularly those of sodium, potassium and lithium. Generally two or more of these chlorides are employed. Fluxes of this type are herein referred to as "alkali metal chloride base" fluxes. While the physical properties of the flux are in large part determined by the base portion, these alkali metal chlorides have practically no oxide removing properties, and consequently, it is necessary to add other substances to the flux which will remove the oxide from aluminum surfaces. Since the most desirable flux is one that will effect a substantially complete removal of the oxide coating in a relatively short period of time, it is important that an efficient oxide removal agent be introduced into the flux.

The materials most frequently employed as oxide removing agents have been fluorides and various fluorine-containing salts. While these substances, in the main, have accomplished the removal of the oxide coating from aluminum surfaces in an altogether satisfactory manner, their usage in the flux is often disadvantageous in other respects, and in some instances it would be desirable to eliminate them altogether. For example, it has been observed that fluorine-containing fluxes frequently discolor aluminum surfaces with which they come in contact, thereby detracting from the appearance of the article. Such fluxes are also toxic, and special precautions must be observed to remove all flux residues where food containers are being welded. Again, the cost of most fluorine-containing compounds may be relatively high and a cheaper material would therefore be desirable. However, it has not been feasible to entirely omit the fluorine-containing material in the flux since no completely suitable substitute of equivalent action has been known. Alkali metal acid sulfates have occasionally been employed in place of fluorides or supplementary to them, but generally with unsatisfactory results.

It is, accordingly, an object of this invention to provide an alkali metal chloride base flux having the ability to rapidly remove oxide from aluminum surfaces. A more particular object is to supply an aluminum welding flux having high oxide removing properties, yet to which no fluorine-containing compound need be added. A further object is to provide a practical low cost aluminum welding flux.

My invention is predicated upon the discovery that an alkali boryl sulfate may be successfully employed in a fluorine-free alkali metal chloride base type of flux to remove the oxide from aluminum surfaces. The term "alkali boryl sulfate" as herein employed refers to a compound of the character described in British Patent No. 19,637, 1891, which has the formula M(BO)SO$_4$ where M represents an alkali metal. This compound is characterized from a chemical standpoint by the presence of the BO group from whence the term "boryl" is derived. The preferred compounds of this group are those of sodium and potassium, but compounds of lithium, rubidium, and caesium may also be employed. These boryl compounds are non-toxic and do not in any way affect the appearance of the aluminum surfaces during the welding operation. They are relatively stable compounds. The cost of alkali boryl sulfate is very small, being considerably less than that of lithium fluoride, for example. Because of these and other desirable properties, the alkali boryl compounds are well adapted for use in aluminum welding fluxes.

The alkali metal chloride base to which the alkali boryl sulfate is added preferably contains chlorides selected from the group consisting of from 5 to 60 per cent sodium chloride, 5 to 60 per cent potassium chloride, and 5 to 80 per cent lithium chloride. The use of at least two chlorides of this group is preferred, and in no case should their total amount be less than 50 per cent of the weight of the entire flux.

When an alkali boryl sulfate is added to a fluorine-free alkali chloride base aluminum welding flux, the action of the flux in removing the oxide from the surface of the aluminum article becomes thorough and rapid with the result that a smooth, uniform, sound weld bead is formed. Fluxes that contain no oxide-removing agent or an agent having a sluggish action either do not clean the metal or do it so imperfectly that there is a very poor adherence between the filler and parent metal, and consequently a sound joint is not made. Furthermore, where fluxes are used which are inefficient in removing the oxide film, it is necessary to "puddle" the molten weld metal in an effort to loosen the oxide film mechanically. Such manipulation produces a rough and often unsound welded joint. Conversely, it may be said that where a rough poorly adhering weld bead is formed, the flux employed did not thoroughly clean the metal surface as fast as the molten filler metal was deposited. By virtue of the fact that the fluorine-free alkali chloride base fluxes containing an alkali metal boryl sulfate will produce a smooth weld bead under ordinary welding conditions, it may be characterized as a flux that thoroughly and rapidly cleans the aluminum surface. This welding flux is also free from the disadvantages sometimes associated with the employment of a flux containing one or more compounds of fluorine. The expression "fluorine-free" as herein employed means that fluorine is excluded from the flux except as it occurs as an impurity.

The amount of boryl compound required to obtain the desired oxide-removing effect in an alkali metal chloride base flux ranges from about 0.5 to 5 per cent. Less than 0.5 per cent has little if any beneficial effect upon the flux while more than 5 per cent does not increase the oxide-removing power of the flux.

Instead of adding the boryl compound to the flux, it may be convenient to add boric acid and alkali sulfates to the flux in substantially the proportions necessary to form the boryl compound. Fluxes containing these substances in the proper proportions act in the same manner as those to which an alkali boryl compound is added. Accordingly, it is considered that the aforesaid substances interact to form an alkali boryl compound, and that such compound is present in the flux at the welding temperature. For example, both normal and acid sodium sulfate react with boric acid in stoichiometrical proportions at temperatures of about 500° C., which is below the welding temperature range, to produce the boryl compound in accordance with the following chemical equations:

1. $Na_2SO_4 + 2H_3BO_3 = Na(BO)SO_4 + 3H_2O + NaBO_2$
2. $NaHSO_4 + H_3BO_3 = Na(BO)SO_4 + 2H_2O$

The parts by weight of these substances which will react with each other to form 0.5 to 5 per cent of the boryl compound can be computed in the usual fashion from the foregoing equations. For example, where the normal sodium sulfate is used, 0.49 to 4.9 per cent of this salt should be present along with 0.42 to 4.2 per cent of boric acid. If the acid sulfate is employed, the ranges are 0.41 to 4.1 per cent of the sulfate and 0.21 to 2.1 per cent of boric acid. If both normal and acid sulfates are employed, the proportions of each should be such that all of the boric acid reacts with the sulfates. Whatever alkali sulfates are employed, it is generally desirable to add both boric acid and the normal and/or acid alkali sulfate in stoichiometrical proportions to produce the desired amount of the boryl compound; slight deviations from such proportions are permissible provided they do not become so large as to result in any appreciable modification in the properties of the flux. Such deviations are considered to be comprehended in the term "substantially stoichiometric proportions" as employed in the claims. Both normal and acid sulfates of all the alkali metals are considered as constituting a group of chemically and physically related substances, and they will therefore be referred to herein as the alkali sulfate group.

As an illustration of a particular flux where normal sodium or acid sulfate is to be used in making 75 grams of flux containing 2 per cent by weight, or 1.5 grams, of sodium boryl sulfate, it would be necessary to use 1.46 grams of normal sodium sulfate together with 1.26 grams of boric acid to produce this quantity of boryl compound. If acid sodium sulfate were to be employed, it would be necessary to employ 1.23 grams thereof together with 0.62 gram of boric acid to produce this same quantity, 1.5 grams, of sodium boryl sulfate.

To illustrate the manner in which the improved flux described herein finds application, I will describe a joining operation wherein two pieces of commercially pure aluminum sheet ⅛" in thickness were welded together by the torch method. The sheets were placed with the edge of one sheet against the edge of the other sheet, and a water slurry of a flux having the composition 44% NaCl, 44% KCl, 10% SrCl₂, 2% Na(BO)SO₄ was applied to the surfaces which were to be subjected to the welding flame. An aluminum weld rod was used that had been dipped into the flux shortly before the start of the joining operation. The welding flame was then applied to the rod, flux and sheet edges, and the joining operation was carried on in the usual manner. Under the influence of the boryl compound, the molten flux rapidly removed the oxide film present on the aluminum surfaces in and adjacent to the joint, thus enabling the filler metal to spread evenly on becoming molten to form a smooth, strong joint, uniformly binding the members. A similar welding operation was conducted in which a flux of this same composition but without any boryl compound was employed. No joining whatsoever took place in this case.

While I have described the type of flux in which the boryl sulfate compound is employed as being an alkali metal chloride base flux, it is to be understood in the appended claims that this includes not only those compositions containing only the chlorides of the alkali metals, but also admixtures of these chlorides and other salts known in the aluminum welding flux art, with the exception of fluorine-containing substances. I have also discovered that such novel additions as 2 to 15 per cent strontium chloride, which is described and claimed in my copending application Serial No. 420,345, may be made to fluxes containing the alkali metal chlorides and boryl sulfate. Any of these addition substances may be employed in the alkali chloride base fluxes so long as they do not interfere with the action of the boryl sulfate. It is also to be understood that reference to alkali boryl sulfate or the boryl sulfate of any alkali metal in the appended claims contemplates both the addition of the boryl compound to a flux during its preparation and the presence in the flux of boric acid and a sulfate in such stoichiometric proportions as are required to form an alkali boryl sulfate.

I claim:
1. A fluorine-free alkali metal chloride base flux for welding aluminum containing from about 0.5 to 5 per cent of an alkali boryl sulfate but substantially free from any unreacted alkali sulfate and boric acid, said flux being characterized by the ability to remove the oxide from aluminum surfaces thoroughly and rapidly during the welding operation.

2. A fluorine-free alkali metal chloride base flux for welding aluminum containing boric acid and alkali sulfate in substantially stoichiometric proportions necessary to form 0.5 to 5 per cent of alkali boryl sulfate, said flux being characterized by the ability to remove the oxide from aluminum surfaces thoroughly and rapidly during the welding operation.

3. A fluorine-free alkali metal chloride base flux for welding aluminum containing about 0.49 to 4.9 per cent normal sodium sulfate, and about 0.42 to 4.2 per cent boric acid, said boric acid and said normal sodium sulfate being present in substantially stoichiometric proportions necessary to form 0.5 to 5 per cent sodium boryl sulfate, said flux being characterized by the ability to remove the oxide from aluminum surfaces thoroughly and rapidly during the welding operation.

4. A fluorine-free alkali metal chloride base flux for welding aluminum containing about 0.41 to 4.1 per cent acid sodium sulfate, and about 0.21 to 2.1 per cent boric acid, said boric acid and said acid sodium sulfate being present in substantially stoichiometric proportions necessary to form 0.5 to 5 per cent sodium boryl sulfate, said flux being characterized by the ability to remove the oxide from aluminum surfaces thoroughly and rapidly during the welding operation.

5. A fluorine-free alkali metal chloride base flux consisting of at least two chlorides of the group composed of 5 to 60 per cent sodium chloride, 5 to 60 per cent potassium chloride, and 5 to 80 per cent lithium chloride, the total amount of said chlorides exceeding 50 per cent of the weight of the entire flux, 2 to 15 per cent strontium chloride and 0.5 to 5 per cent of an alkali boryl sulfate.

6. A fluorine-free alkali metal chloride base flux consisting of at least two chlorides of the group composed of 5 to 60 per cent sodium chloride, 5 to 60 per cent potassium chloride, and 5 to 80 per cent lithium chloride, the total amount of said chlorides exceeding 50 per cent of the weight of the entire flux, 2 to 15 per cent strontium chloride and boric acid and alkali sulfate in substantially the stoichiometric proportions necessary to form 0.5 to 5 per cent of alkali boryl sulfate.

MIKE A. MILLER.